(12) United States Patent
Wang et al.

(10) Patent No.: US 10,348,721 B2
(45) Date of Patent: Jul. 9, 2019

(54) USER AUTHENTICATION

(71) Applicant: Hewlett Packard Enterprise Development LP, Houston, TX (US)

(72) Inventors: Shuai Wang, Beijing (CN); Jun Qing Xie, Beijing (CN); Qun Yang Lin, Beijing (CN); Xunteng Xu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 65 days.

(21) Appl. No.: 15/032,077

(22) PCT Filed: Oct. 30, 2013

(86) PCT No.: PCT/CN2013/086203
§ 371 (c)(1),
(2) Date: Apr. 26, 2016

(87) PCT Pub. No.: WO2015/061977
PCT Pub. Date: May 7, 2015

(65) Prior Publication Data
US 2016/0261581 A1 Sep. 8, 2016

(51) Int. Cl.
*H04L 29/00* (2006.01)
*H04L 29/06* (2006.01)

(52) U.S. Cl.
CPC ........ *H04L 63/083* (2013.01); *H04L 63/0272* (2013.01); *H04L 63/166* (2013.01)

(58) Field of Classification Search
CPC .. H04L 63/083; H04L 63/0272; H04L 63/166

USPC .......................................................... 726/7
See application file for complete search history.

(56) References Cited

U.S. PATENT DOCUMENTS

| | | | |
|---|---|---|---|
| 7,444,508 B2 | 10/2008 | Karjala et al. | |
| 8,819,769 B1* | 8/2014 | van Dijk | H04L 63/0876 726/1 |
| 2002/0152126 A1* | 10/2002 | Lieu | G06F 17/30864 705/26.62 |
| 2008/0016230 A1* | 1/2008 | Holtmanns | H04L 63/08 709/229 |
| 2011/0202466 A1 | 8/2011 | Carter | |
| 2012/0005477 A1 | 1/2012 | Wei et al. | |

(Continued)

FOREIGN PATENT DOCUMENTS

| CN | 101867928 A | 10/2010 |
|---|---|---|
| CN | 103190130 A | 7/2013 |
| JP | 2009-163546 A | 7/2009 |

OTHER PUBLICATIONS

Barrybourse., "Using Mobile Phones for Microsoft VPN Authentication," 2008, pp. 1-7, Microsoft.

(Continued)

*Primary Examiner* — Anthony D Brown
*Assistant Examiner* — Michael D Anderson
(74) *Attorney, Agent, or Firm* — Brooks, Cameron & Huebsch, PLLC (57) ABSTRACT

In one implementation, instructions stored on a non-transitory computer-readable medium are executable by a processing resource to cause a computing device to fetch a token code from a home subscriber server (HSS) for a user and log in to a Virtual Private Network (VPN) server using the token code.

20 Claims, 4 Drawing Sheets

(56) References Cited

U.S. PATENT DOCUMENTS

2012/0281540 A1  11/2012  Khan et al.
2012/0295587 A1  11/2012  Paya et al.

OTHER PUBLICATIONS

D. M'Raihi et al., "HOTP: An HMAC-Based One-Time Password Algorithm," Dec. 2005, pp. 1-26, Network Working Group, Request for Comments: 4226, The Internet Society.
D. M'Raihi et al., "TOTP: Time-Based One-Time Password Algorithm," May 2011, pp. 1-12, Internet Engineering Task Force (IETF), Request for Comments: 6238, IETF Trust.
International Search Report, International Application No. PCT/CN2013/086203, dated Jul. 2, 2014, pp. 1-4.
International Preliminary Report on Patentability received for PCT Patent Application No. PCT/CN2013/086203, dated May 12, 2016, 7 pages.
3rd Generation Partnership Project, "Technical Specification Group Core Network and Terminals; Organization of subscriber data", Release 13, 3GPP TS 23.008 V13.4.0, Mar. 2016, 134 pages.

* cited by examiner

USER AUTHENTICATION

BACKGROUND

A Virtual Private Network (VPN) can enable a private network connection over a public network using encryption. The encryption can be used to transport data and/or information over the network connection securely. A two-factor authentication can include a one-time password (e.g., a software or hardware token) and user provided information. A software token can be installed on a user device and a software token application can run along with a VPN application, exposing the token code to the user. The user can manually enter the token code into the VPN application. A hardware token can be included in a device, for instance. The hardware token can be physically transportable but replacement of the hardware token may also be a physical replacement.

DETAILED DESCRIPTION

A two-factor authentication (also known as a multi-factor authentication) can use a one-time password as one factor of the authentication process for signing into a Virtual Private Network (VPN). The password can be generated by an entity (e.g., a token) which can be referred to as "something the user has." A second factor can include user provided information (e.g., Personal Identification Number (PIN), a password, etc.), which can be referred to as "something the user knows." A token can be a physical device and/or a software token. The two-factor authentication process can provide evidence for a user's identity for the authentication process.

A multi-factor authentication can include factors such as knowledge factors, possession factors, and/or inherence factors, among other factors. A knowledge factor can be referred to as "something the user knows" and can include a user password, a PIN, answers to pre-determined questions, etc. Such knowledge factors can be used by someone other than the user and can create potential security issues (e.g., allowing access to an unauthorized user that is able to log in). A user password, PIN, answers, etc., can be stolen by an unauthorized user. The unauthorized user can then log in to the VPN and gain access to information that can create the security issues. A possession factor can be referred to as "something the user has" and can include a hardware entity, a software application, a virtual token, etc. The possession factor can include the presence of an independent entity such as a physical token (e.g., a hardware token) and/or a virtual token. Inherence factors can be referred to as "something the user is" and can include identifying the user himself or herself by using biometric identification, (e.g., fingerprints and/or iris recognition, among other methods), and other physical identification and/or characteristics of the user. Identifying both a user device and the identity of the user can be problematic for Virtual Private Network (VPN) applications. For example, it can be difficult to insure that a device is currently being used by the intended user rather than by someone unauthorized to use the device. In another example, user information used to log in to the device can be obtained from an unauthorized user and used by the unauthorized user to gain access to the device.

An example of the present disclosure can include performing the token code generation at a remote side Home Subscriber Server (HSS) or Home Location Register (HLR). The HSS and/or HLR can be operated in an operator's core network. A user's local mobile device can be capable of accessing the network (e.g., a cellular network) to fetch a token for VPN authentication from the operator's core network. The token and the identification of the user device can provide additional security when included with a PIN and/or user password.

Fetching can include obtaining information and/or transferring information from one location to another. For example, fetching can include a token gateway interacting with a short message service center (SMSC) to exchange a short message using Short Message Peer-to-Peer (SMPP) protocol. An SMSC can include a network element in a mobile telephone network that can be used to store, forward, convert, and/or deliver short message service (SMS) messages. An SMPP protocol can include an open, industry standard protocol designed to provide a flexible data communication interface for the transfer of short message data between a number of entities (e.g., External Short Messaging Entities (ESME), Routing Entities (RE), and/or Message Centers). An SMPP can be used to allow third parties (e.g., value-added service providers such as news organizations) to submit messages, often in bulk. The SMSC can communicate with the HSS for information queries using a Mobile Application Part (MAP) (e.g., a Signaling System No. 7 (SS7) protocol). A MAP can provide an application layer for various nodes in GSM (Global System for Mobile Communications) and UMTS (Universal Mobile Telecommunications System) mobile core networks and GPRS core networks to communicate with each other to provide services to mobile phone users. The MAP can be used to access the Home Location Layer (HLS), Visitor Location Register (VLR), Mobile Switching Center, Equipment Identity Register, Authentication Center, Short Message Service Center, and/or Serving GPRS Support Node (SGSN).

Figure 1:
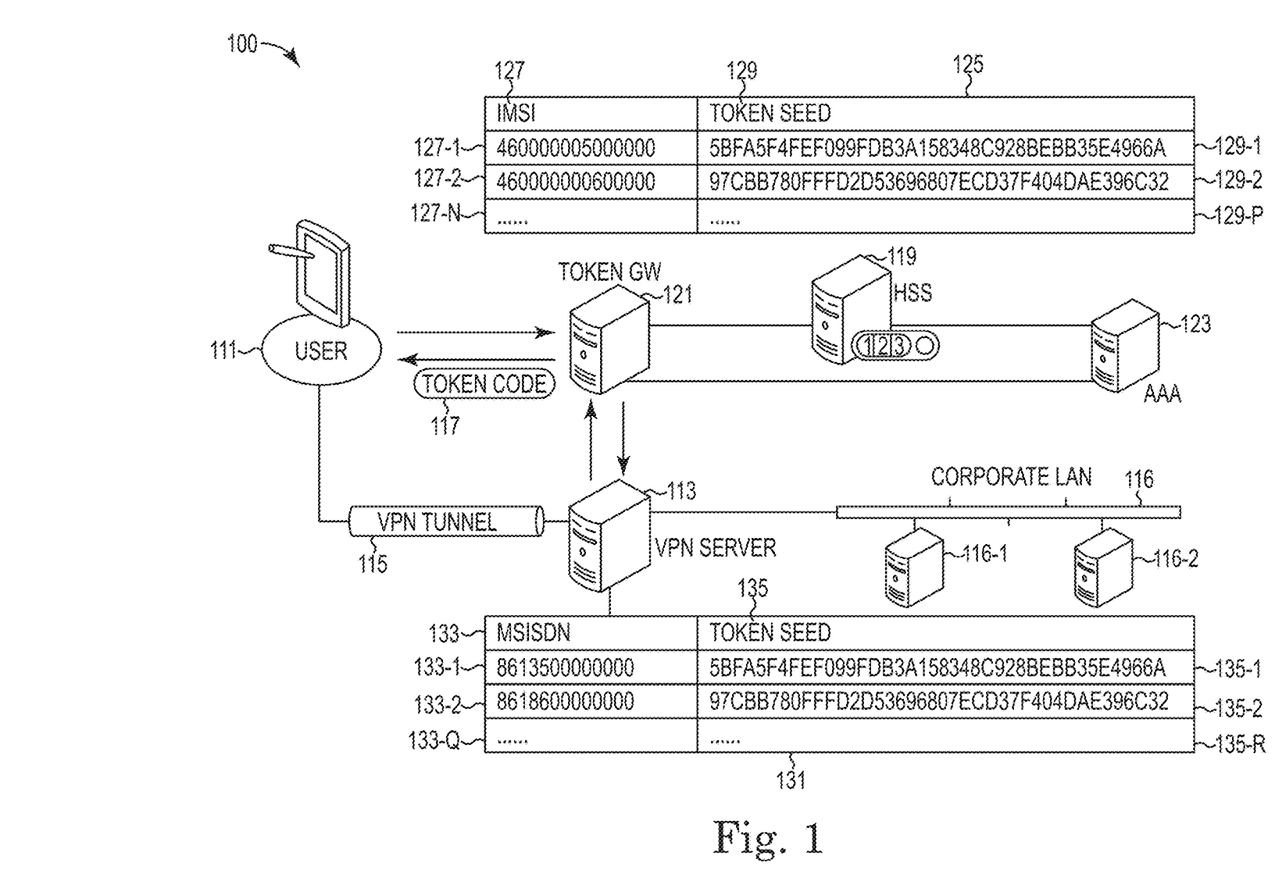
FIG. 1 illustrates an example of a system for user authentication according to the present disclosure.

FIG. 1 illustrates an example of a system for user authentication according to the present disclosure. The system 100 can include a user 111 (e.g., a client, user device, client device, etc.) in communication with a Virtual Private Network (VPN) server 113 (and/or Authentication Server) through a VPN Tunnel 115. A tunnel (e.g., the VPN Tunnel 115) can include a network connection between two locations. A VPN Tunnel 115 can transfer information by using encryption to securely transfer the information over the tunnel. The VPN server 113 can be connected to a corporate Local Area Network (LAN) 116 that includes a number of servers 116-1, 116-2. The user 111 can use a token code 117 to gain access to the VPN Server 113 and/or the number of servers 116-1, 116-2. The token code 117 can be fetched (e.g., requested and received) from a Home Subscriber Server (HSS) 119. An HSS can, for example, include a master user database that supports an Internet Protocol (IP) Multimedia Core Network Subsystem (IMS). An IMS can be an architectural framework for delivering IP multimedia services. The IMS can use Internet Engineering Task Force (IETF) protocols to aid access of multimedia and voice applications from wireless and/or wireline terminals.

In some examples of the present disclosure, the token code 117 can be sent (e.g., fetched) from the HSS 119 through a token gateway (GW) 121 to the user 111. The token gateway 121 can accept access from the user device requesting a token code for VPN authentication through a cellular network. For example, the token gateway 121 can exchange token seeds, other information associated with user enrollment, authentication service messages for operator side authentication, and/or other service related information with the VPN Server 113. The token gateway 121 can include a Short Messaging Service (SMS) Gateway or a Transport Layer Security (TLS) server, for instance. The token gateway 121 and the HSS 119 can be connected to an Authentication, Authorization, and Accounting (AAA) server 123.

The token gateway 121 as an SMS gateway can process token requests from the VPN application of a user device in an SMS message format. The SMS gateway can analyze the message content indicating a valid token request sent from a user device (e.g., a subscriber device). The SMS gateway can generate a token request, for example. The generated token request can include information related to user identification information (e.g., an International Mobile Subscriber Identity (IMSI)) that can be used as a query key for the network heading to assist the HSS 119 in token generation. The user identification information can include an IMSI, an integrated circuit card identifier (ICCID), a mobile subscriber integrated services digital network-number (MSISDN), and an International Mobile Station Equipment Identity number (IMEI), among other identifiers. The identification of the user can include one or any number and/or combination of these identifiers. After receiving a token response from the HSS 119, the SMS gateway can extract authentication information (e.g., the IMSI and the token code, in the format: <IMSI, token code>). The SMS gateway can send the authentication information back to the subscriber device using an SMS message. The sent message can, for example, be encrypted during communication for security purposes.

The token gateway 121 as a TLS server can allow the user device to access an operator's core network through a secure connection (e.g., a link). For example, the TLS server can provide a user with a trusted Certificate Authority (CA) root certificate and check a client certificate (associated with the user) to authenticate the client's (e.g., the user's) identity. The client certificate can be distributed through an online and/or offline channel. With a secure connection established, the TLS server can receive a token request from a subscriber client (e.g., user, user device) to query to an HSS 119. The TLS server can, in various examples, send back the token code received from the HSS to the user. The connection between the VPN server 113 and the TLS server (e.g., token gateway 121) can be a TLS connection for exchange of authentication information. However, examples in accordance with the present disclosure are not so limited and can include other gateway implementations in order to uniquely identify the user's device identity, handle token request from a client (e.g., user, user device), and query a token code from the HSS 119.

The AAA (Authentication, Authorization, and Accounting) server 123 can control which users are allowed access to which services and/or how the users consume those services. Services can include, but are not limited to IP address filtering, address assignment, route assignment, quality of service, bandwidth control and/or traffic management, and/or encryption. Authentication can refer to the process of authenticating an entity's (e.g., a user's) identity through verification of identification and/or corresponding credentials. Credentials can include passwords, one-time tokens, digital certificates, digital signatures, and/or phone numbers (e.g. mobile phone numbers).

The AAA server 123 can determine whether a particular entity's (e.g. user's) has authorization to perform a particular activity. Authorization can be determined based on a number of restrictions, in a number of examples. Restrictions, as used herein, can include time-of-day restrictions, physical location restrictions, read vs. write access, and/or restrictions related to multiple access by a same entity and/or use. The AAA server 123 can perform accounting functions. The accounting can refer to tracking of network resources consumed by users for the purpose of capacity and trend analysis, cost allocation, and/or billing. Accounting can include recording authentication and authorization failures. For example, accounting can include gathering information such as identity of a user, the nature of a service delivered, when the service began, when the service ended, and a status report.

The HSS 119 can store an authentication table 125 that includes authentication information. The authentication information can include a column for IMSI information 127 and a column for corresponding token seeds 129. A relation between IMSI information and a token seed can be, for instance, a one-to-one mapping. As an example, a particular IMSI 127-1 can include an identification number 460000005000000 which corresponds to a particular token seed 129-1 which includes the designation 5BFA5F4FEF099 FDB3A158348C928BEBB35E 4966A. The IMSI 127-1 has a one-to-one mapping to the token seed 129-1. As a further example, there can also be a one-to-one mapping of IMSI 127-2 including number 4600100006000000 which corresponds to token seed 129-2 including designation 97CBB780FFFD2D53696807ECD37F404DAE396C32.

A number of IMSIs 127-N can correspond to a number of token seeds 129-P. For example, the HSS 119 can store a token seed (e.g., a shared key) to generate a token code 117 for each user. While the token seed is stored in the HSS in this example, other examples are not so limited. The token seed can be stored in a number of locations. For example, the token seed cab be stored in a network enterprise and managed by the VPN server so that token code verification can occur more locally.

The VPN server 113 can store an authentication table 131 that includes authentication information. The authentication information can include a column for MSISDN information 133 and a column for token seeds 135. A relation between the MISISDN information and the token seeds can be a one-to-one mapping. For example, an MSISDN number 133-1 can include 8613500000000 and correspond to a token seed 135-1 including designation 5BFA5F4FEF099FDB3A158 348C928BEBB35E4966A. As a further example, a one-to-one mapping of MSISDN 133-2 including number 8618600000000 can correspond to token seed 135-2 including 97CBB780F FFD2D53696807ECD37F404DAE396C32. Any number of MSISDN numbers (e.g., 133-Q) can correspond to any number of token seeds (e.g., 135-R).

A token request from the user 111 to the HSS 119 through token gateway 121 can include an IMSI of a user as a query key. By identifying the user and the token seed, the HSS 119 can calculate a password (e.g., a one-time password) based on the token seed. The calculation can be based on additional factors. For example, a synchronous dynamic password token can be a time-based one-time password that can take a clock in addition to a secret key as an input. An example formula to determine such a password can include: H(k, t), where k is a secret key for a particular user, t is a clock of the current timestamp, and H can be a hash function to generate a one-time password which substantiates the calculation results during a particular period of time (e.g., for one minute).

The token code 117 can be sent back in a token response to the user (e.g., user device running VPN application) requesting the token code. The response can include an example form including an <IMSI, token code> pair with an IMSI as an identifier. A token request can include a number of user IMSI keys for a batch query operation. The HSS 119 can include all <IMSI, token code> mapped items in a token response to an initiator of the request in order to increase traffic speed.

Figure 2:
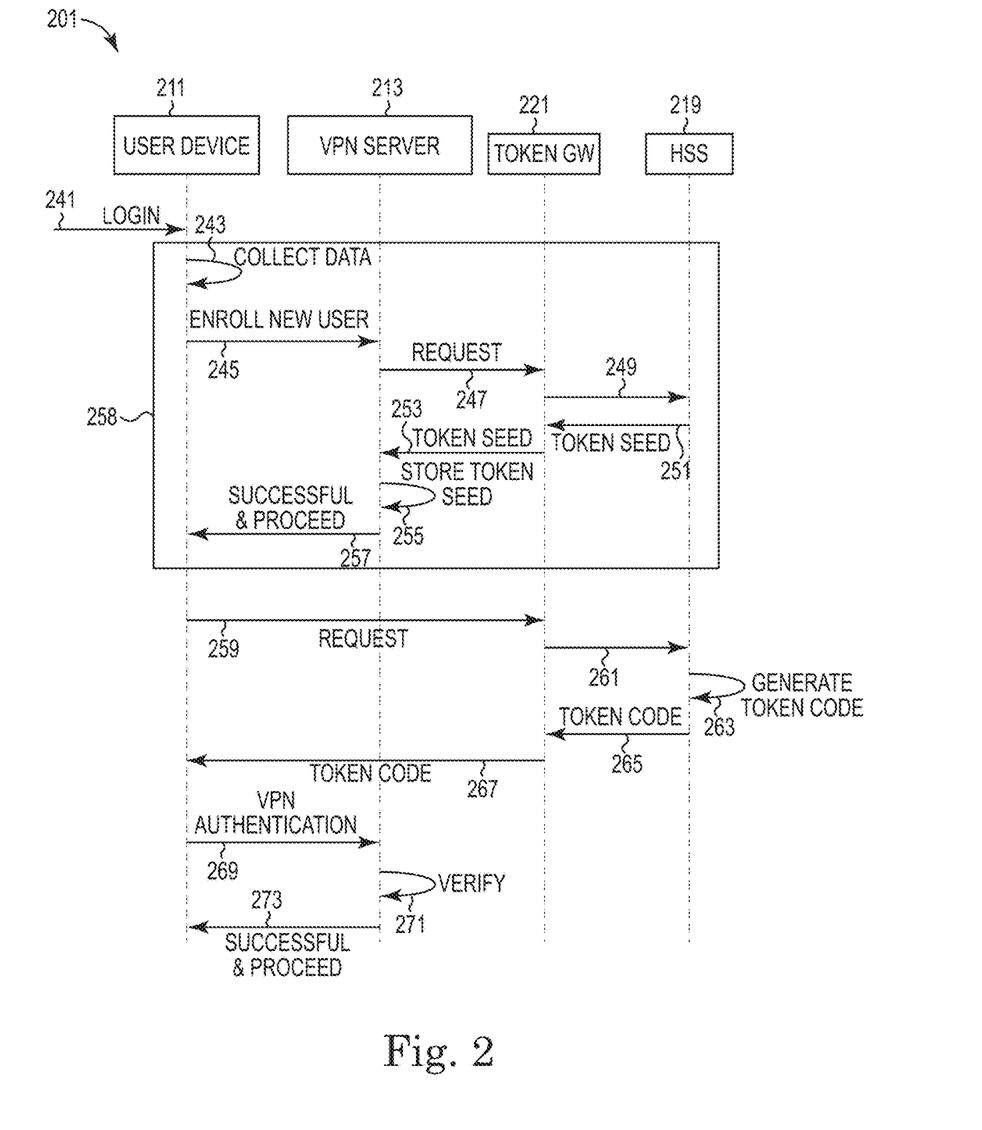
FIG. 2 illustrates an example of a flowchart for user authentication according to the present disclosure.

FIG. 2 illustrates an example of a flowchart for user authentication according to the present disclosure. The flowchart 201 can include operations performed by a user device 211 (e.g., user 111 in FIG. 1), a VPN server 213 (e.g., VPN server 113 in FIG. 1), a token GW 221 (e.g. token gateway 121 in FIG. 1), and an HSS 219 (e.g., HSS 119 in FIG. 1). The flow chart can include a user device 211 requesting to log in at 241. The user device 211 can include a VPN application to perform the authentication requests and communicate with a token gateway and VPN server.

The VPN application on the user device 211 collects data, at 243, received by the user. The collected data can include user information including a user ID, a user password, etc. The VPN application on the user device 211 can send a request, at 245, to enroll a new user (e.g., the user of the user device 211) to the VPN server 213. The VPN server 213 can send a request, at 247, to fetch a token seed from the token GW 221. The token GW 221 can send a request (e.g., to fetch), at 249, to the HSS 219 to send a token seed. The token seed can be sent, at 251, to the token GW 221 from the HSS 219.

The token GW 221 can send, at 253, the token seed to the VPN server 213. The VPN server, at 255, can store the token seed. The VPN server 213 can send an authorization to the user device 211, at 257, indicating enrollment has been successful and to proceed. For example, the number of operations 258 can be performed as an initial enrollment of a new user. The number of operations 258 can be performed once per user in order to enroll whereas subsequent logins can include the VPN application requesting a token code rather than enrollment.

In one embodiment, a VPN application can be used to fetch a token seed either directly after enrolling a new user and/or in a subsequent session following enrolling a new user. The flowchart 201 can include a user device 211 including a VPN application. A user of the user device 211 can log in, at 241, to a VPN application. The VPN application can send a request, at 259, for a token code to the token GW 221. The token GW 221 can request, at 261, a token code from the HSS 219. The HSS 219 can generate, at 263, a token code based on authentication information. The authentication information can include identification information (e.g., an IMSI, an ICCID, an MSISDN, an IMEI, etc.). Authentication information can include a token seed that corresponds to user identification (e.g., corresponding IMSI 127 and token seed 129 information illustrated in the authentication table 125 in FIG. 1).

The generated token code can be sent, at 265, to the token GW 221. The token GW 221 can be sent, at 267, to the VPN application on the user device 211. The VPN application can send the authentication information, at 269, (e.g., received token code, user authentication information, etc.) to the VPN server 213 to gain secure access. The VPN server, at 271, can verify the information received from the VPN server 221. The VPN server 221 can send an acknowledgment, at 273, to the VPN application that the authentication request has been successful. The VPN application can proceed to access the requested secure information (e.g., servers 116-1, 116-2 in FIG. 1) and allow the user to receive the secure information through the VPN application.

Figure 3:
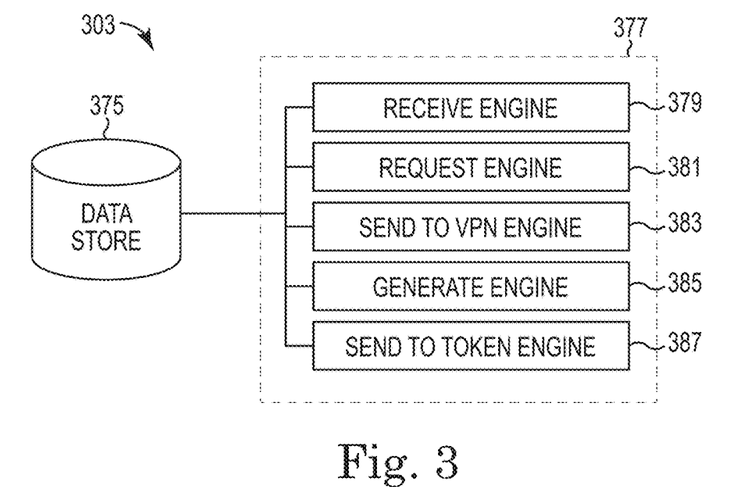
FIG. 3 illustrates an example of a system for user authentication according to the present disclosure.

FIG. 3 illustrates an example of a system for user authentication according to the present disclosure. The system 303 can include a data store 375, a fetching system 377, and/or a number of engines 379, 381, 383, 385, 387. The fetching system 377 can be in communication with the data store 375 via a communication link, and can include the number of engines (e.g., receive engine 379, request engine 381, send to VPN engine 383, generate engine 385, and send to token engine 387). The fetching system 377 can include additional or fewer engines than illustrated to perform the various functions described herein.

The number of engines can include a combination of hardware and programming that is configured to perform a number of functions described herein (e.g., request a token code from a token gateway). The programming can include program instructions (e.g., software, firmware, etc.) stored in a memory resource (e.g., computer-readable medium, machine readable medium, etc.) as well as hard-wired program (e.g., logic).

The receive engine 379 can include hardware and/or a combination of hardware and programming to receive a request from a user device for a token code to authenticate access to a VPN server. The user device can send the request through a VPN application. For example, the user can log in to the VPN application before sending the request. The request can be received at a token gateway. The token gateway can be connected to a home subscriber server (HSS). The request can include identification information associated with the user. The identification information can be used to request a token code associated with the particular user of the user device requesting the token code.

The request engine 381 can include hardware and/or a combination of hardware and programming to request the token code from a home subscriber server (HSS). The request can be from a token gateway to the HSS, for instance. The token gateway can include information received from a user device in the request to the HSS. The received information can include user identification information.

The send to VPN engine 383 can include hardware and/or a combination of hardware and programming to send a token code to a VPN server for VPN authentication. The token code can, for example, be sent from a token gateway to the VPN server once the token gateway has received the token code from the HSS.

The generate engine 385 can include hardware and or combination of hardware and programming to generate a token code including a one-to-one mapping of a user to a token seed associated with the token code. The token code can be generated based on user information, a timestamp, and/or period of time. The generation can be performed by using a hash function. The time period can indicate a length of time that the password will be valid. For example, the time period can be based on a predetermined period of time.

The send to token engine 387 can include hardware and or a combination of hardware and programming to send a token code to a token gateway. The token code can be sent from an HSS to the token gateway. The token gateway can use the information received from the HSS server to send back to the user device requesting the token code.

Figure 4:
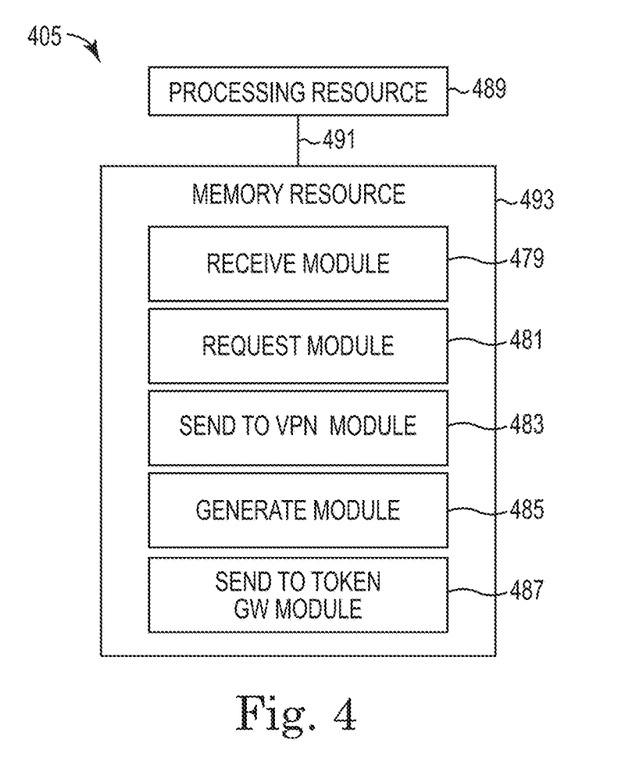
FIG. 4 illustrates an example of a system for user authentication according to the present disclosure.

FIG. 4 illustrates an example of a system for user authentication according to the present disclosure. The system can include, for instance, a computing device 405. The computing device 405 can be any combination of hardware and program instructions configured to share information. The hardware for example can include a processing resource 489 and/or a memory resource 493 (e.g., computer-readable medium (CRM), machine readable medium (MRM), database, etc.) A processing resource 489, as used herein, can include any number of processors capable of executing instructions stored by a memory resource 493. Processing resource 489 may be integrated in a single device or distributed across multiple devices. The program instructions (e.g., computer-readable instructions (CRI)) can include instructions stored on the memory resource 493 and executable by the processing resource 489 to implement a desired function (e.g., to request a token code).

The memory resource 493 can be in communication with a processing resource 489. A memory resource 493, as used herein, can include any number of memory components capable of storing instructions that can be executed by processing resource 489. Such memory resource 493 can be a non-transitory CRM or MRM. Memory resource 493 may be integrated in a single device or distributed across multiple devices. Further, memory resource 493 may be fully or partially integrated in the same device as processing resource 489 or it may be separate but accessible to that device and processing resource 489. Thus, it is noted that the computing device 405 may be implemented on a user device (e.g., phone, mobile phone, tablet, notebook, etc.), on a server device, on a collection of server devices, and/or a combination of the user device and the server device.

The memory resource 493 can be in communication with the processing resource 489 via a communication link (e.g., a path) 491. The communication link 491 can be local or remote to a machine (e.g., a computing device) associated with the processing resource 489. Examples of a local communication link 491 can include an electronic bus internal to a machine (e.g., a computing device) where the memory resource 493 is one of volatile, non-volatile, fixed, and/or removable storage medium in communication with the processing resource 489 via the electronic bus.

A number of modules 479, 481, 483, 485, 487 can include CRI that when executed by the processing resource 489 can perform a number of functions. The number of modules 479, 481, 483, 485, 487 can be sub-modules of other modules. For example, the receive module 479 and the request module 481 can be sub-modules and/or contained within the same computing device. In another example, the number of modules 479, 481, 483, 485, 487 can comprise individual modules at separate and distinct locations (e.g., CRM, etc.).

Each of the number of modules 479, 481, 483, 485, 487 can include instructions that when executed by the processing resource 489 can function as a corresponding engine as described herein. For example, the receive module 479 can include instructions that when executed by the processing resource 489 can function as the receive engine 379. In another example, the request module 481 can include instructions that when executed by the processing resource 489 can function as the request engine 381.

Figure 5:
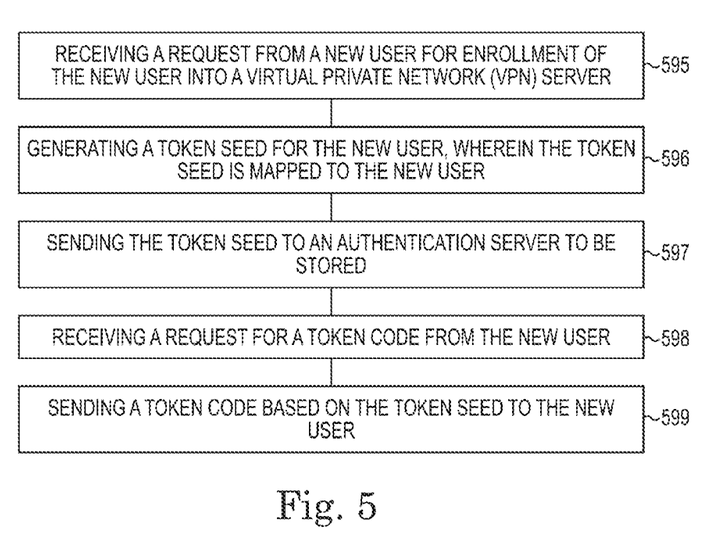
FIG. 5 illustrates a flow diagram of an example method for user authentication according to the present disclosure.

FIG. 5 illustrates a flow diagram of an example method for user authentication according to the present disclosure. The method can include, at 595, receiving a request from a new user for enrollment of the new user into a Virtual Private Network (VPN) server. The new user can use a user device to send the request. For example, the user device can be equipped with a hardware module that can access into an operator's cellular network. The cellular network can include mobile devices with Global Systems for Communication (GSM), universal mobile telecommunications system (UMTS), and/or long term evolution (LTE) networks. The user device can include a customized VPN application with the ability to setup connections with an operator's cellular network in a uniquely identified manner (e.g., through SMS exchange, mutual authenticated TLS connection, and/or other similar methods).

At 596, the method can include generating a token seed for the new user. The token seed can be mapped to the new user with a one-to-one mapping. An IMSI identification (e.g., IMSI 127-1 in FIG. 1) can be matched with a token seed (e.g., token seed 129-1) in order to create a token code associated with a particular user. For example, the token code can be generated based on a time stamp and/or time period that the token code is in effect.

At 597, the method can include sending the token seed to the VPN server to be stored. The VPN server can store the token seed to determine whether a token code received from a user matches an expected token code based on the stored token seed associated with the user.

At 598, the method can include receiving a request for a token code from the new user. Once a new user has enrolled with the VPN server and a token seed has been created for the new user, the VPN application of the user device can receive confirmation that the enrollment and token seed generation was successful. The VPN application can send a request for a token code to log in to the VPN server.

At 599, the method can include sending a token code based on the token seed to the new user. The VPN application of the user device can receive the token code and use it to log in to a VPN server. For instance, the VPN server can calculate an expected token code for that user with particular factors. Factors can include a time period. The VPN server can compare the expected token code calculated and the received token code from the VPN application to determine if there is a match. If the token code received and the expected token code match, the VPN server can send an acceptance of authentication to the VPN application. Once authenticated with the VPN server, the user device can log in to the VPN servers and begin accessing data in the servers.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

In addition, the proportion and the relative scale of the elements provided in the figures are intended to illustrate the examples of the present disclosure, and should not be taken in a limiting sense. As used herein, the designators "N" and "P," particularly with respect to reference numerals in the drawings, indicate that a number of the particular feature so designated can be included with a number of examples of the present disclosure.

What is claimed:

1. A non-transitory computer-readable medium storing instructions executable by a processing resource to cause a computer to:

enroll a user to use a Virtual Private Network (VPN) server by:
  requesting a token seed from a home subscriber server (HSS) through a token gateway, wherein the token seed comprises a shared key; and
  receiving the token seed;
generate a token code comprising a one-to-one mapping of the user to the token seed associated with the token code;
fetch a token code, via the token gateway, from the HSS for the user; and
permit the user to login to the VPN server using the token code.

2. The medium of claim 1, wherein the instructions are executable by the processing resource to cause the computer to authenticate the user at the VPN server by using verification information.

3. The medium of claim 2, wherein the verification information includes at least one of:
  a user name;
  a mobile phone number;
  a PIN code; and
  a password.

4. The medium of claim 1, comprising instructions executable by the processing resource to cause the computer to, prior to fetching the token code, enroll the user to use the VPN server by requesting the token seed and receiving the token seed.

5. The medium of claim 4, comprising instructions executable by the processing resource to cause the computer to store an association between the received token seed and the user.

6. The medium of claim 5, comprising instructions executable by the processing resource to cause the computer to compare information received from the user and the stored association.

7. The medium of claim 6, wherein the information received from the user includes user information and a token code from the user.

8. A system for user authentication, comprising:
a token gateway, wherein the token gateway is operable to:
  receive a request from a user device for a token code to authenticate access to a Virtual Private Network (VPN) server;
  request the token code from a home subscriber server (HSS); and
  send the token code to the VPN server for VPN authentication; and
an HSS, wherein the HSS is operable to:
  generate the token code comprising a one-to-one mapping of the user to a token seed associated with the token code, wherein the token seed comprises a shared key; and
  send the token code to the token gateway.

9. The system of claim 8, wherein the token gateway comprises one of a short messaging service (SMS) gateway and a transport layer security (TLS) server.

10. The system of claim 8, wherein the token gateway is operable to, at a first request from the user device:
  enroll a new user of the user device; and
  send a token seed associated with the new user to the VPN server.

11. The system of claim 8, wherein the token code is generated based on a one-to-one mapping of the user of the user device to the token seed.

12. A method for user authentication, comprising:
  receiving a request from a new user for enrollment of the new user into a Virtual Private Network (VPN) server;
  generating a token seed for the new user, wherein the token seed is mapped to the new user, wherein the token seed comprises a shared key;
  sending the token seed to the VPN server to be stored;
  receiving a request for a token code from the new user; and
  generating the token code comprising a one-to-one mapping of the new user to a token seed associated with the token code;
  sending, via a token gateway, the token code based on the token seed to the new user.

13. The method of claim 12, comprising sending user login information and the token code to the VPN server.

14. The method of claim 12, comprising:
  calculating an expected token code from the user; and
  comparing the expected token code to the token code received from the new user.

15. The method of claim 14, comprising authenticating the new user when the expected token code and the received token code match.

16. The medium of claim 1, wherein the token code is generated based on a time stamp or a time period that the token code is in effect.

17. The medium of claim 1, further comprising instructions to store the token seed in the VPN server.

18. The medium of claim 17, further comprising instructions to store the token seed in the HSS.

19. The system of claim 8, wherein the shared key further comprises a shared key between the HSS and an entity.

20. The system of claim 19, wherein the entity further comprises the VPN server.

* * * * *